United States Patent

[11] 3,577,626

| [72] | Inventor | Darl L. Link |
| | | Charlotte, Mich. |
| [21] | Appl. No. | 797,137 |
| [22] | Filed | Feb. 6, 1969 |
| [45] | Patented | May 4, 1971 |
| [73] | Assignee | Hoover Ball and Bearing Company |
| | | Saline, Mich. |

[54] METHOD OF MAKING A TRIM MOLDING
10 Claims, 11 Drawing Figs.
[52] U.S. Cl. ..................................... 29/445,
29/460, 29/509, 29/514, 29/515, 293/71
[51] Int. Cl. ....................................... B23p 9/00
[50] Field of Search ........................... 29/460,
445, 509, 515, 514; 293/62, 71, 71 (R)

[56] References Cited
UNITED STATES PATENTS

| 1,731,514 | 10/1929 | Welcome | 29/514 |
| 2,268,849 | 1/1942 | Salisbury | 29/458 |
| 2,882,376 | 4/1959 | Charbonneau | 29/515UX |
| 3,168,781 | 2/1965 | VanGorp | 29/509X |
| 3,290,082 | 12/1966 | Fritsch | 293/71X |
| 3,360,847 | 1/1968 | Chick et al. | 29/458X |
| 3,388,523 | 6/1968 | Evans | 293/71X |

*Primary Examiner*—Charlie T. Moon
*Attorney*—Olsen & Stephenson

ABSTRACT: A method of manufacturing a trim molding having an anodized aluminum channel member in which is locked a vinyl bumper strip. The method includes the steps of extruding the aluminum in the form of an open channel with the bottom wall inclined upwardly from the sides to the center, inserting the vinyl strip into the open channel, and pressing down on the strip so that the bottom wall of the channel is flattened, causing the sides of the channel to close on the vinyl strip, thereby locking it in place in the channel. Appropriate buffing, anodizing of the aluminum, and cutting to length of the interlocked parts then follows. A product made according to the method is also disclosed.

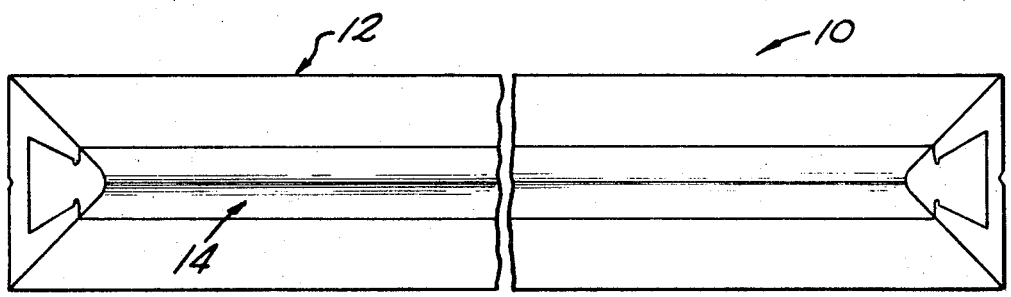
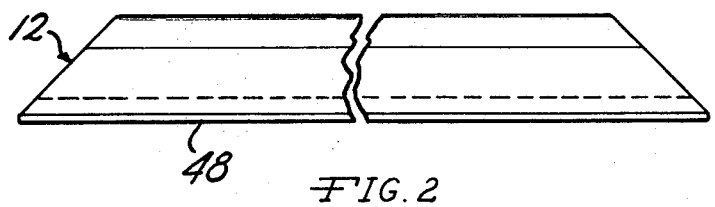
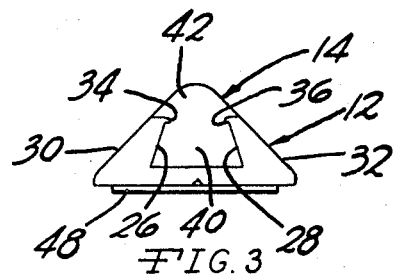
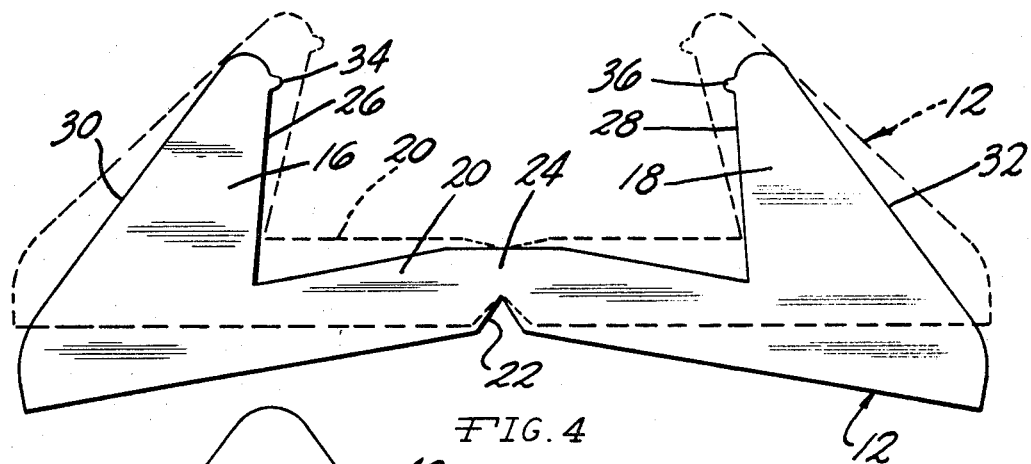
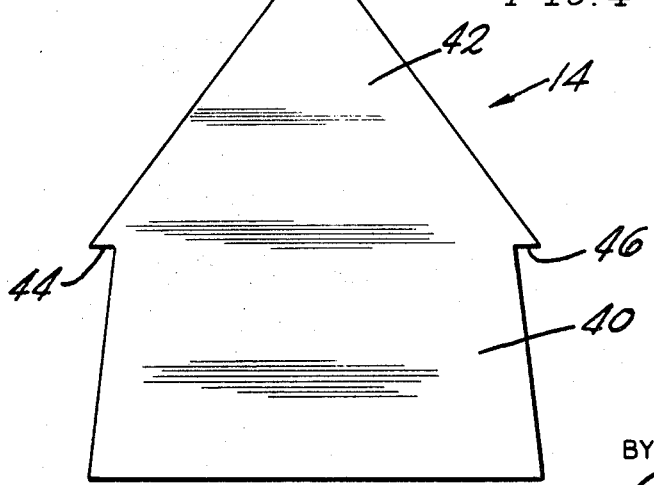
INVENTOR
DARL L. LINK

PATENTED MAY 4 1971 3,577,626

INVENTOR
DARL L. LINK

BY
Olsen and Stephenson
ATTORNEYS

3,577,626

METHOD OF MAKING A TRIM MOLDING

BACKGROUND OF THE INVENTION

The present invention relates to a trim molding especially adapted for use as a bumper, and to the method of making the same.

Two characteristics that are highly desirable in a trim molding that is to be used as a bumper are (1) that the molding have an attractive appearance and (2) that it be constructed and arranged to absorb blows or impacts without altering its appearance or destroying its effectiveness to function as a bumper. It is also desirable that a molding which meets these requirements be capable of manufacture by procedures that are economically feasible.

To provide a trim molding having the aforementioned optimum characteristics, a construction and arrangement has been proposed whereby a bumper strip having resilient properties is mounted in a relatively rigid channel member. Problems have arisen in the manufacture of a trim molding having these properties when attempting to provide an arrangement whereby the resilient strip is supported by the rigid member, and at the same time to provide a structure such as this which has an attractive appearance.

SUMMARY OF THE INVENTION

The present invention has overcome the shortcomings of the prior art and has provided an improved method of making a trim molding, and an improved molding which provides a very attractive appearance and has a sturdy construction.

According to one form of the present invention, a method of manufacturing a trim molding is provided wherein a base member is extruded from aluminum to define a channel with an open top and having sidewalls and a bottom wall which is inclined upwardly from the sidewalls to the center of the channel. An elastic strip is then inserted into the open side of the base member, and thereafter, pressure is exerted downwardly on the elastic strip of a magnitude sufficient to flatten the bottom wall so as to pivot the sidewalls inwardly into engagement with the lower portion of the elastic strip to grip the same. Preferably, the extruded base member and the elastic strip have transverse cross sections of a shape so that when the base member and the elastic strip are interlocked, the cross section of the interlocked parts will be generally that of a triangle, the upper portion of the triangle being the elastic strip, and the lower portion of the triangle being the outer surfaces of the sidewalls of the base member.

After the interlocking operation has been completed, the ends of the interlocked parts can be cut to a desired shape, the interlocked parts can be buffed, and the aluminum anodized to provide an attractive finish.

A vinyl plastic is preferably employed for the elastic strip, but other suitable plastic materials, synthetic rubbers or natural rubber may also be used.

Accordingly, it is an object of the present invention to provide an improved and a method of making a trim molding.

Other objects of this invention will appear in the following description and appended claims, reference being had to the accompanying drawings forming a part of this specification wherein like reference characters designate corresponding parts in the several views.

BRIEF DESCRIPTION OF THE DRAWING

FIG. 1 is a top plan view of a trim molding embodying the present invention;

FIG. 2 is a front elevational view of the trim molding;

FIG. 3 is an end elevational view of the trim molding;

FIG. 4 is an enlarged end elevational view of the base member showing in solid lines the shape of the extrusion, and showing in broken lines the shape of the base member after performing one of the steps of the method embodying the present invention;

FIG. 5 is an end elevational view of an elastic strip adapted to be inserted into and clamped by the base member illustrated in FIG. 4;

DESCRIPTION OF THE PREFERRED EMBODIMENTS

Figure 6:
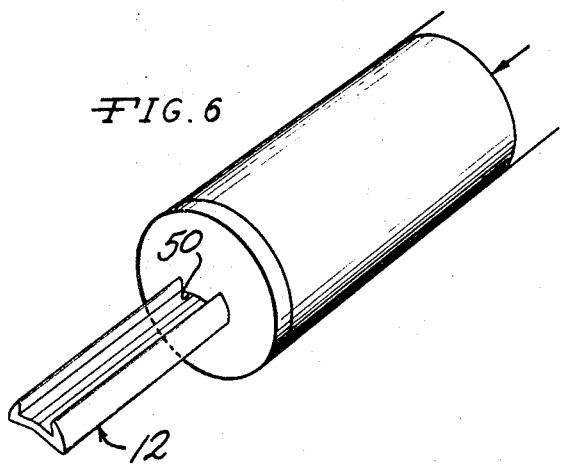
FIG. 6 is a schematic illustration of the step of extruding the aluminum base member.
Figure 9:
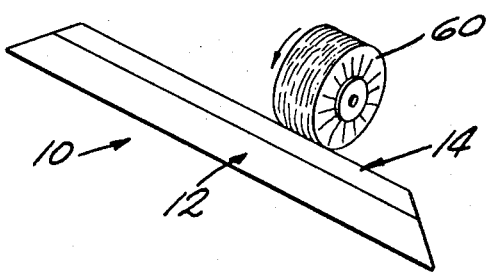
FIG. 9 shows still another step of the method wherein the interlocked parts are buffed.
Figure 7:
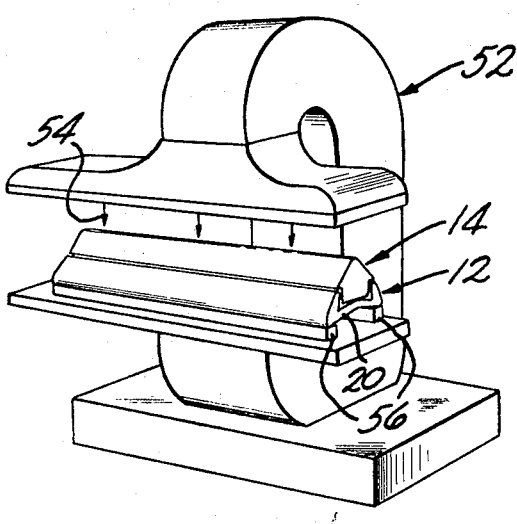
FIG. 7 is a schematic illustration of the step of inserting the elastic strip into the open base member in preparation for applying pressure to clamp the base member to the elastic strip.
Figure 10:
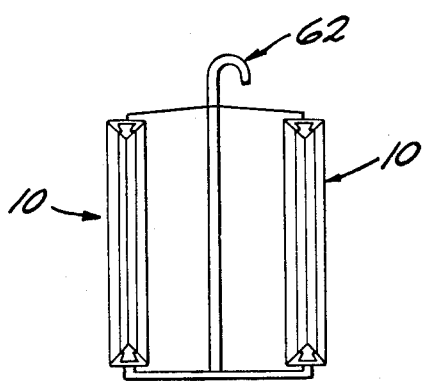
FIG. 10 illustrates the step of racking parts in preparation for carrying out an anodizing operation.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description limitation.

Referring now to the drawings, the trim molding 10 embodying the present invention will be described. The trim molding 10 includes the body member 12 and the elastic strip 14. The body member 12 is preferably formed from aluminum, although other metals suitable for extrusion processes may also be used. The body member 12 initially is extruded in the form shown in solid lines in FIG. 4 in the shape of a channel having sidewalls 16 and 18 and a bottom wall 20 inclined upwardly from the sides 16 and 18 toward the center or longitudinal axis of the channel member 12. The bottom wall has a notch 22 extending its full length to provide a portion of reduced thickness at 24 to facilitate bending the bottom wall or flattening the same to the shape shown in broken lines.

The sidewalls have interior surfaces 26 and 28 defining acute angles with respect to the bottom wall 20. Similarly, the exterior surfaces 30 and 32 define acute angles with the bottom wall 20 of a lesser degree. Preferably, the sidewalls 16 and 18 have inwardly protruding ribs 34 and 36 for a purpose presently to be described.

The elastic strip 14 has a lower portion 40 of a general shape of a truncated isosceles triangle and an upper portion 42 of the general shape of an isosceles triangle. The base of the triangle of the upper portion 40 is wider than the upper surface of the truncated lower portion 40 so as to provide laterally outwardly extending shoulders 44 and 46. The bottom surface of the elastic strip 14 preferably has a width substantially equal to the dimension between the protrusions 34 and 36 of the channel member 12 to facilitate inserting the strip into the open side of the channel member, when in its open position shown in solid lines in FIG. 4.

By a method to be described, the elastic strip 14 is interlocked in the channel member 12 in the manner shown in end elevation in FIG. 3. As there shown, the exterior side walls 30 and 32 are coplanar with the sidewalls of the triangular upper portion 42, and the interior wall surfaces 26 and 28 are pressed tightly against the sidewalls of the truncated portion 40 so as to hold the elastic strip in a state of compression. The protruding ribs 34 and 36 penetrate into the elastic material to interlock the elastic strip 14 and the channel member 12. The shoulders 44 and 46 fit over the upper edges of the sidewalls 30 and 32.

Preferably, the channel member is made of aluminum and its external surface is anodized. However, other metals that can be extruded may also be used.

Mounted on the channel member 12 is a double-backed adhesive tape 48 which may be used to fasten the trim molding to a supporting surface. It will be understood that other fastening means can be used, such as clips, weld studs, tabs or conventional screws.

The elastic strip 14 is preferably made from a vinyl plastic material, and other suitable resilient materials such as synthetic rubbers, natural rubber, or other organic plastic materials may also be used.

Referring now to FIGS. 6—11, a method of manufacturing the trim molding will be described. The elastic strip 14 can be formed by any conventional extrusion process, which will not be described. The channel member 12 is preferably made from aluminum material that is extruded through an extrusion orifice 50 as is shown in FIG. 6 to define an extrusion having the shape shown in solid lines in FIG. 4. Thereafter, the extrusion is placed in a press 52 which is adapted to exert pressure downwardly in the direction of the arrows 54 on the top surface of the elastic strip 12 which has been positioned in the open channel in the location shown in FIG. 7. It will be noted that bars 56 are positioned at the outer edges of the bottom wall 20 so that when a pressure is exerted down on the upper portion of the elastic strip 14, equal and opposite forces will be exerted upwardly on the outer edges of the bottom wall 20 causing the bottom wall to be flattened. This action will readily occur because of the thinner bottom wall section at 24 causing the outer extremities of the bottom wall 20 and the sidewalls 16 and 18 to pivot around the longitudinal axis of the channel member, thereby reshaping the channel member to that shown in broken lines in FIG. 4.

Figure 8:
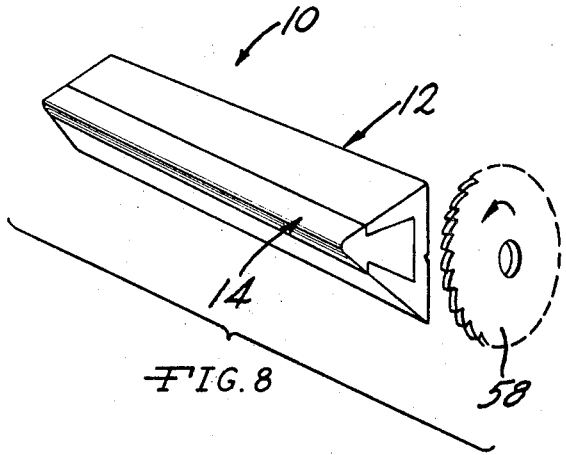
FIG. 8 shows another step of the method wherein the interlocked parts are trimmed at the ends.
Figure 11:
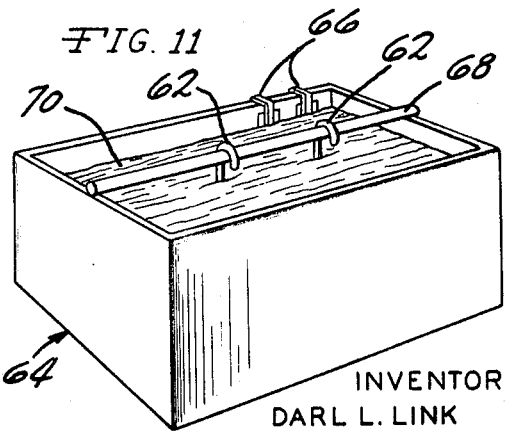
FIG. 11 illustrates the step of anodizing the aluminum base member.

After the channel member 12 and elastic strip 14 have been interlocked together, the opposite ends can be trimmed by a mitering operation such as is shown in FIG. 8. Any type of saw can be used, a rotary saw 58 being shown for this purpose.

Subsequent to cutting the ends to the desired shape, the trim molding can be advanced to a buffing station where a buffing wheel 60 can perform a buffing operation, after which the trim molding can be moved to an anodizing station where a plurality of the trim moldings can be mounted on conventional anodizing racks 62. A plurality of these racks 62 can then be inserted into a conventional anodizing tank 64 which is provided with a lead cathode 66, a copper bar anode 68 and a sulfuric acid solution 70. The parts can be anodized for approximately 30 minutes with the vinyl elastic strip staked in place in the channel member. Thereafter, the trim moldings can be removed and the tape 48 attached to the bottom wall of the channel member 12.

By virtue of the described method of manufacturing the trim molding a very attractive and sturdy trim molding is provided.

I claim:

1. A method of manufacturing a trim molding having a relatively rigid base member and an elastic strip interlocked in said base member and projecting laterally therefrom comprising the steps of:
   a. forming the base member with a cross section of a channel shape with an open top and having sidewalls and a bottom wall upwardly directed toward its longitudinal axis so as to define two bottom wall sections inclined upwardly toward said axis and said sidewalls being inclined inwardly at acute angles with respect to their associated bottom wall sections;
   b. inserting into the open side of the base member an elastic strip; and
   c. exerting pressure in one direction on said elastic strip and in the other direction on said bottom wall on opposite sides of said longitudinal axis of a magnitude sufficient to pivot the bottom wall sections and the associated sidewalls in opposite directions around said axis until said bottom wall is substantially flat and said sidewalls clampingly engage the strip.

2. A method of manufacturing a trim molding as defined in claim 1, wherein said base member is formed by extruding a metal.

3. A method of manufacturing a trim molding as defined in claim 2, wherein said base member is extruded with a notch in its bottom wall dividing said two sections.

4. A method of manufacturing a trim molding as defined in claim 2, wherein said base member is extruded with ribs projecting inwardly from its sidewalls.

5. A method of manufacturing a trim molding as defined in claim 2, wherein the portion of said strip projecting from said base member is generally triangular in cross section, and wherein said base member is extruded with the angle of inclination of said sidewalls being substantially the same as the base angles of the triangular portions of said strip.

6. A method of manufacturing a trim molding as defined in claim 2, wherein said metal is aluminum 7. A method of manufacturing a trim molding as defined in claim 6, which includes the additional step of anodizing the aluminum base member after the strip has been clampingly engaged.

8. A method of manufacturing a trim molding as defined in claim 7, which includes the additional step of buffing the base member and engaged strip prior to anodizing the base member.

9. A method of manufacturing a trim molding as defined in claim 8, which includes the additional step of cutting off the ends of the base member and the engaged strip prior to buffing the base member.

10. A method of manufacturing a trim molding having a relatively rigid base member and an elastic strip interlocked in said base member and projecting laterally therefrom comprising the steps of:
   a. extruding the base member from aluminum to define a cross section of a channel shape with an open top and having sidewalls and a bottom wall upwardly directed toward its longitudinal axis so as to define two bottom wall sections upwardly inclined toward said axis, said sidewalls having outer surfaces inclined inwardly at equal acute angles with their associated bottom wall sections, said sidewalls also having inner surfaces inclined inwardly at acute angles with respect to their associated bottom wall sections;
   b. inserting into the open side of said base member an elastic strip with a cross section defining as a lower portion a truncated isosceles triangle and as an integral upper portion an isosceles triangle having a wider base than the top of said truncated triangle, the base angles thereof being substantially equal to the first-named acute angles; and
   c. exerting pressure on said elastic strip of a magnitude sufficient to flatten said bottom wall so as to pivot said sidewalls inwardly into engagement with said lower portion and in planar alignment with the sides of said upper portion.